(12) United States Patent
Dong et al.

(10) Patent No.: US 12,529,812 B2
(45) Date of Patent: Jan. 20, 2026

(54) GEO-ACOUSTIC EVENT LOCATION METHOD AND INSTABILITY DISASTER EARLY WARNING METHOD BASED ON SAME, GEO-ACOUSTIC SENSOR, MONITORING SYSTEM, AND READABLE STORAGE MEDIUM

(71) Applicant: CENTRAL SOUTH UNIVERSITY, Changsha (CN)

(72) Inventors: Longjun Dong, Changsha (CN); Yihan Zhang, Changsha (CN)

(73) Assignee: CENTRAL SOUTH UNIVERSITY, Changsha (CN)

(*) Notice: Subject to any disclaimer, the term of this patent is extended or adjusted under 35 U.S.C. 154(b) by 502 days.

(21) Appl. No.: 18/014,177

(22) PCT Filed: Jan. 13, 2022

(86) PCT No.: PCT/CN2022/071698
§ 371 (c)(1),
(2) Date: Jan. 3, 2023

(87) PCT Pub. No.: WO2022/156582
PCT Pub. Date: Jul. 28, 2022

(65) Prior Publication Data
US 2023/0324575 A1    Oct. 12, 2023

(30) Foreign Application Priority Data

Jan. 19, 2021    (CN) .......................... 202110068789.4

(51) Int. Cl.
*G01V 1/30* (2006.01)
*G01V 1/28* (2006.01)

(52) U.S. Cl.
CPC .............. *G01V 1/307* (2013.01); *G01V 1/288* (2013.01); *G01V 2210/123* (2013.01); *G01V 2210/65* (2013.01)

(58) Field of Classification Search
CPC .. G01V 1/307; G01V 1/288; G01V 2210/123; G01V 2210/65
See application file for complete search history.

(56) References Cited

U.S. PATENT DOCUMENTS

| 2013/0081805 A1 | 4/2013 | Bradford et al. |
| 2018/0136350 A1* | 5/2018 | Dell'Aversana ......... G01V 1/34 |
| 2020/0263529 A1* | 8/2020 | Ahmed .................... E21B 7/06 |

FOREIGN PATENT DOCUMENTS

| CN | 101770038 A | 7/2010 |
| CN | 102495425 A | 6/2012 |

(Continued)

OTHER PUBLICATIONS

Konstantinov et al., "Designing an improved geo-acoustic event location algorithm in the "Prognoz-ADS" system", 2020 ISC Publication, pp. 1-6 (Year: 2020).*

*Primary Examiner* — Elias Desta
(74) *Attorney, Agent, or Firm* — Bayramoglu Law Offices

(57) ABSTRACT

Sound signal when a wave generated by a geo-acoustic event source reaches any monitoring point (S1), constructing a theoretical propagation difference model and an observed propagation difference model of the waveform characterization quantity between monitoring points, to calculate a waveform characterization quantity difference value between two monitoring points (S2); and constructing an objective function based on the theoretical propagation difference model and the observed propagation difference model, and obtaining the location of the geo-acoustic event by means of inversion based on the objective function (S3). According to the geo-acoustic event location method, the (Continued)

arrival time, time domain parameters, spectral information, and waveform shape of the geo-acoustic signal when the wave generated by the geo-acoustic event source reaches any monitoring point are considered, then the non-uniformity of a propagation medium is comprehensively reflected, and the inversion precision of geo-acoustic event location is finally improved.

9 Claims, 2 Drawing Sheets

(56) References Cited

FOREIGN PATENT DOCUMENTS

| | | | | |
|---|---|---|---|---|
| CN | 104062677 A | 9/2014 | | |
| CN | 105388511 A | 3/2016 | | |
| CN | 109507728 A | 3/2019 | | |
| CN | 109595036 A | 4/2019 | | |
| CN | 109597125 A | 4/2019 | | |
| CN | 111999765 A | 11/2020 | | |
| CN | 112904414 A | 6/2021 | | |
| GB | 2615711 A | * 8/2023 | ............ | G01V 1/307 |
| WO | 2013176579 A1 | 11/2013 | | |

* cited by examiner

GEO-ACOUSTIC EVENT LOCATION METHOD AND INSTABILITY DISASTER EARLY WARNING METHOD BASED ON SAME, GEO-ACOUSTIC SENSOR, MONITORING SYSTEM, AND READABLE STORAGE MEDIUM

CROSS REFERENCE TO THE RELATED APPLICATIONS

This application is the national phase entry of International Application No. PCT/CN2022/071698, filed on Jan. 13, 2022, which is based upon and claims priority to Chinese Patent Application No. 202110068789.4, filed on Jan. 19, 2021, the entire contents of which are incorporated herein by reference.

TECHNICAL FIELD

The present disclosure belongs to the technical field of geotechnical engineering disaster protection, and particularly relates to a geo-acoustic event location method and an instability disaster early warning method based on same, an intelligent geo-acoustic sensor, a monitoring system, and a readable storage medium.

BACKGROUND

With the development of human society, many large projects such as tailings dams, dams, tunnels, mines, highways and subways have been built on rock and soil. Casualties and the equipment loss caused by the instability of these projects are shocking. The collapse of the St. Francis Dam in Los Angeles in 1928 caused death of up to 600 people. The collapse of the tailings pond dam of the Shanxi Xinta Mining Industry in 2008 caused death of 277 people and direct economic losses of up to RMB 96.192 million. The massive landslide occurred in the Hpakant Jade Mining Area in Myanmar in July 2020 caused death of at least 174 people in total. Scientific research technicians have been trying to explore effective ways to predict geo-acoustic disaster instability, and a large number of traditional monitoring methods such as displacement, stress, vibration, strain and microseism have achieved some results at a certain level.

The technique about the inversion of the spatial location of geo-acoustic events is a key technique. In any engineering scenario, the wave propagation medium is anisotropic, but conventional location of microseismic or acoustic emission sources is a theoretical calculation model with time-based location, and is based on the assumption that the propagation medium is isotropic. More importantly, the arrival time-based location method only considers the local point information of the complete waveform signal during the inversion of the location of the geo-acoustic event, ignoring many other key factors including the amplitude, frequency and shape representing the time-frequency characteristics of the waveform, and therefore the precision of the result of existing location methods only taking the arrival time into account needs to be improved.

SUMMARY

The present disclosure aims to provide a geo-acoustic event location method and an instability disaster early warning method based on same, an intelligent geo-acoustic sensor, a monitoring system, and a readable storage medium, where, the acoustic wave migration and propagation process is comprehensively considered based on the arrival time, time domain parameters, spectral information, and waveform shape to reflect the non-uniformity of a propagation medium as a whole, and then the location method proposed above can significantly reduce the error of location inversion of a geo-acoustic event. The proposed instability disaster early warning method constructs a highly applicable, quasi-time-efficient and low failure rate geo-acoustic instability disaster early warning means. The proposed intelligent geo-acoustic sensor performs micro signal enhancement, filtering fidelity, and other processing on acquired geo-acoustic signals, which effectively improves the anti-interference capability, effectively senses multi-band geo-acoustic signals and realizes the signal fidelity effect.

In one aspect, the present disclosure provides a geo-acoustic event location method, including the following steps:

S1: acquiring an observed value of a waveform characterization quantity of a geo-acoustic event, the waveform characterization quantity including any combination of the arrival time, time domain parameters, spectral information, and waveform shape of a geo-acoustic signal when a wave generated by a geo-acoustic event source reaches any monitoring point;

S2: constructing a theoretical propagation difference model and an observed propagation difference model of the waveform characterization quantity between monitoring points, where, a waveform characterization quantity difference value between two monitoring points is calculated; and S3: constructing an objective function based on the theoretical propagation difference model and the observed propagation difference model, and obtaining the location of the geo-acoustic event by means of inversion based on the objective function.

According to the present disclosure, the acoustic wave migration and propagation process is comprehensively considered based on the arrival time, amplitude, corner frequency, rise angle and the like to reflect the non-uniformity of the propagation medium as a whole during location of the geo-acoustic event, and then the location method proposed above is an anisotropic non-linear location method, which can significantly reduce the error of location inversion of the geo-acoustic event. The preferred waveform characterization quantity is a combination of the arrival time, time domain parameters, spectral information and waveform shape, thus reflecting the propagation characteristics of the geo-acoustic signal in a more comprehensive manner and improving the accuracy of the location result of the geo-acoustic event.

Optionally, the objective function is as follows:

$$G(x_p, y_p, z_p, \ldots) = \min \Sigma(DA_{xyz} + DF_{xyz} + DS_{xyz} + DT_{xyz})$$

in the formula, $G(x_p, y_p, z_p, \ldots)$ indicates the objective function of the geo-acoustic event $(x_p, y_p, z_p)$, $x_p, y_p, z_p$ is the position coordinate of the geo-acoustic event, and $DF_{xyz}$, $DA_{xyz}$, $DS_{xyz}$ and $DT_{xyz}$ indicate the degree of deviation of the observed quantity and the theoretical value of the propagation difference of the waveform characterization quantity, respectively.

Optionally, the formulas for calculating $DF_{xyz}$, $DA_{xyz}$, $DS_{xyz}$ and $DT_{xyz}$ are as follows:

$$DT_{xyz} = \Sigma(\Delta t_{xyz}^{nm} - \Delta t_0^{nm})^2$$

$$DA_{xyz} = \Sigma(\Delta A_{xyz}^{nm} - \Delta A_0^{nm})^2$$

$$DF_{xyz} = \Sigma(\Delta f_{xyz}^{nm} - \Delta f_0^{nm})^2$$

$$DS_{xyz} = \Sigma(\Delta S_{xyz}^{nm} - \Delta S_0^{nm})^2$$

in the formula, $\Delta t_{xyz}^{nm}$ and $\Delta t_0^{nm}$ respectively indicate the theoretical arrival time difference and the observed quantity of the arrival time difference between two different monitoring points m and n; $\Delta A_{xyz}^{nm}$ and $\Delta A_0^{nm}$ respectively indicate the theoretical attenuation difference and the observed value of the attenuation difference of the time domain parameters do between two different monitoring points m and n; $\Delta f_{xyz}^{nm}$ and $\Delta f_0^{nm}$ respectively indicate the theoretical dissipation and the observed dissipation of the spectral information f between two different monitoring points m and n; and $\Delta S_{xyz}^{nm}$ and $\Delta S_0^{nm}$ respectively indicate the theoretical value of the waveform shape evolution difference and the observed value of the waveform shape evolution difference between two different monitoring points m and n.

Optionally, the time domain parameter is any one or any combination of the rise time, duration, amplitude and energy parameters of a waveform, and the spectral information is any combination of all frequency information of the waveform after Fourier decomposition; and the waveform shape is a function that defines the shape of a geo-acoustic signal waveform in a time domain.

In a second aspect, the present disclosure provides an intelligent geo-acoustic sensor, including a geo-acoustic sensing unit, an automatic gain and acoustic-electric conversion unit, an RC filtering network unit, an analog-to-digital conversion unit, an intelligent sensing filter unit and a photoelectric conversion unit which are connected to each other in a communication mode, where the geo-acoustic sensing unit acquires multi-band geo-acoustic signals;

the automatic gain and acoustic-electric conversion unit is configured for converting the geo-acoustic signal into an analog signal, and performing initial adjustment on the analog signal to realize a fast response of a weak signal gain;

the RC filtering network unit is configured for truncating the analog signal in a frequency domain to complete preliminary filtering;

the analog-to-digital conversion unit is configured for converting the analog signal into a digital signal;

the intelligent sensing filter unit is configured for performing denoising and filtering processing on the digital signal; and the photoelectric conversion unit is configured for converting the digital signal into an optical signal, where the signal acquired by the intelligent geo-acoustic sensor is used for locating a geo-acoustic event according to the steps of the geo-acoustic event location method.

The intelligent geo-acoustic sensor provided by the present disclosure not only realizes multi-band acquisition of the geo-acoustic signal, but also integrates the functions of signal processing to realize the integration of signal acquisition and processing; and with regard to the specific signal processing process, the present disclosure performs micro signal enhancement, filtering fidelity and other processing on the acquired geo-acoustic signal, so as to effectively improve the anti-interference capability, sense the effective multi-band geo-acoustic signal and realize the signal fidelity effect.

Optionally, a metal full-shielding frame is disposed outside the intelligent geo-acoustic sensor to block external interference.

Optionally, the intelligent sensing filter unit is a DSP or FPGA module, and is configured with one or more filtering modules of low pass, high pass, band pass, band stop, Kalman filtering and wavelet filtering; and the automatic gain and acoustic-electric conversion unit is configured with an AGC automatic gain control module.

In a third aspect, the present disclosure further provides an instability disaster early warning method based on the geo-acoustic event location method, including the following steps:

step 1: forming self-clustering clusters according to the location result of a geo-acoustic event, the self-clustering cluster being obtained by clustering the spatial distribution of the geo-acoustic event;

step 2: counting precursor index information of each self-clustering cluster according to a pre-set time window, where the precursor index information is any combination of indexes of the relative energy, moment magnitude, apparent volume, b value of the self-clustering cluster, time series change of a rate of geo-acoustic events, dominant frequency and corner frequency of the geo-acoustic event in the self-clustering cluster; and if the sum of a category of precursor indexes of all the geo-acoustic events in the self-clustering cluster under one time window becomes larger compared with the sum of the same category of precursor indexes under a previous time window, the precursor factor of the corresponding precursor index is 1, and the corresponding precursor index thereof refers to the relative energy, moment magnitude and apparent volume; and step 3: performing instability disaster early warning analysis based on precursor factors of precursor indexes of each self-clustering cluster, where the greater the sum of the precursor factors of all the precursor indexes of the self-clustering cluster is, the greater the risk is.

Optionally, the precursor indexes include the indexes of the relative energy, moment magnitude, apparent volume, b value of the self-clustering cluster, time series change of the rate of geo-acoustic events, dominant frequency and corner frequency of the geo-acoustic event in the self-clustering cluster and are divided into three main categories, where the relative energy, moment magnitude, apparent volume and b value of the self-clustering cluster are categorized into the first main category, the time series change of the rate of geo-acoustic events is categorized into the second main category, the dominant frequency and corner frequency are categorized into the third main category, the corresponding precursor factors thereof are expressed as $P_1$, $P_2$ and $P_3$, and the early warning rule based on the precursor factors is as follows:

if $P_1+P_2+P_3=3$, it indicates that operation in the area is prohibited;

if $P_1+P_2+P_3=2$, it indicates that the hidden danger of a potential source of danger requires to be removed;

if $P_1+P_2+P_3=1$, it indicates that operation can be carried out under real-time monitoring; and if $P_1+P_2+P_3=0$, it indicates safe operation.

In a fourth aspect, the disclosure further provides a geo-acoustic event monitoring system characterized by including a geo-acoustic signal sensing module, a geo-acoustic event location module and a geo-acoustic event instability disaster early warning module connected in a communication mode, where the geo-acoustic signal sensing module is configured for sensing geo-acoustic signals;

the geo-acoustic event location module is configured for locating geo-acoustic events by using the geo-acoustic event location method; and the geo-acoustic event instability disaster early warning module is configured for performing instability disaster early warning analysis by using the instability disaster early warning method.

In a fifth aspect, the present disclosure further provides a readable storage medium storing a computer program, the computer program being called by a processor to execute:

S1: acquiring an observed value of a waveform characterization quantity of a geo-acoustic event;

S2: constructing a theoretical propagation difference model and an observed propagation difference model of the waveform characterization quantity between monitoring points; and S3: constructing an objective function based on the theoretical propagation difference model and the observed propagation difference model, and obtaining the location of the geo-acoustic event by means of inversion based on the objective function;

or to execute:

step 1: forming self-clustering clusters according to the location result of a geo-acoustic event, the self-clustering cluster being obtained by clustering the spatial distribution of the geo-acoustic event;

step 2: counting precursor index information of each self-clustering cluster according to a pre-set time window; and step 3: performing instability disaster early warning analysis based on precursor factors of precursor indexes of each self-clustering cluster, where the greater the sum of the precursor factors of all the precursor indexes of the self-clustering cluster is, the greater the risk is.

In a sixth aspect, the present disclosure further provides a system, including a processor and a memory, the memory storing a computer program, the processor calling the computer program to execute:

S1: acquiring an observed value of a waveform characterization quantity of a geo-acoustic event;

S2: constructing a theoretical propagation difference model and an observed propagation difference model of the waveform characterization quantity between monitoring points; and S3: constructing an objective function based on the theoretical propagation difference model and the observed propagation difference model, and obtaining the location of the geo-acoustic event by means of inversion based on the objective function;

or to execute:

step 1: forming self-clustering clusters according to the location result of a geo-acoustic event, the self-clustering cluster being obtained by clustering the spatial distribution of the geo-acoustic event;

step 2: counting precursor index information of each self-clustering cluster according to a pre-set time window; and step 3: performing instability disaster early warning analysis based on precursor factors of precursor indexes of each self-clustering cluster, where the greater the sum of the precursor factors of all the precursor indexes of the self-clustering cluster is, the greater the risk is.

Beneficial Effects

1. The present disclosure provides a geo-acoustic event location method which abandons the technical means of arrival time-based location in the past, makes full use of the acquired waveform information, and considers to use the time-frequency characteristics, such as the arrival time, time domain parameters, spectral information and waveform shape as waveform representation quantities, so as to reflect the non-uniformity of a propagation medium as a whole, thereby reflecting the propagation characteristics of a geo-acoustic signal more comprehensively and improving the accuracy of the location result of a geo-acoustic event.

2. The present disclosure provides an intelligent geo-acoustic sensor which integrates data acquiring and data processing, further ensures the capture of tiny geo-acoustic event information through the configuration of an automatic gain and acoustic-electric conversion unit, effectively proposes the rejection of superimposition of instability noise signals in the high-sensitivity monitoring process through an intelligent sensing filter unit, senses effective multi-band geo-acoustic signals and realizes the signal fidelity effect.

3. The present disclosure provides an instability disaster early warning method based on the geo-acoustic event location method, which comprehensively considers the precursor information of disaster instability under different dimensions, and constructs a highly applicable, quasi-time-efficient and low failure rate geo-acoustic instability disaster early warning method based on the change trend of precursor factors.

DETAILED DESCRIPTION OF THE EMBODIMENTS

The present disclosure is further described below with reference to the embodiments.

Example 1

Scientific research technicians have been trying to explore effective ways to predict geo-acoustic disaster instability, and a large number of traditional monitoring methods such as displacement, stress, vibration, strain and microseism have achieved some results at a certain level. However, most of the existing monitoring methods are point monitoring, and microseismic monitoring is regional coverage monitoring, it is difficult to capture tiny precursor characteristic information in the instability and sub-instability stages of the geotechnical project, there is an urgent need to invent a high-sensitivity sensing apparatus capturing the occurrence of small deformation, small rupture and small collapse of rock and soil, and an intelligent sensor capable of eliminating the superimposed noise in the high-sensitivity monitoring process so as to acquire the change information in the instability evolution process of the rock as a whole. For this purpose, the present example provides an intelligent multi-band geo-acoustic sensor as shown in FIG. 1.

Figure 1:
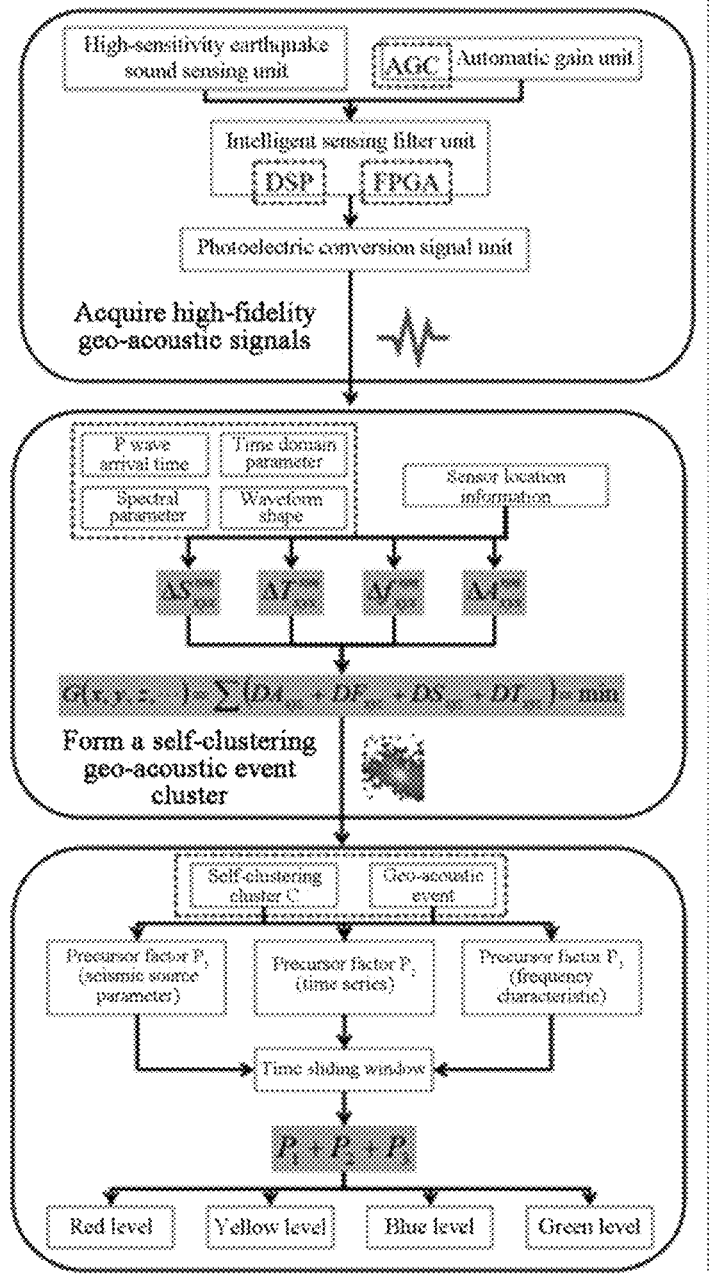
FIG. 1 is a schematic view of an application process provided by the present disclosure.
Figure 2:
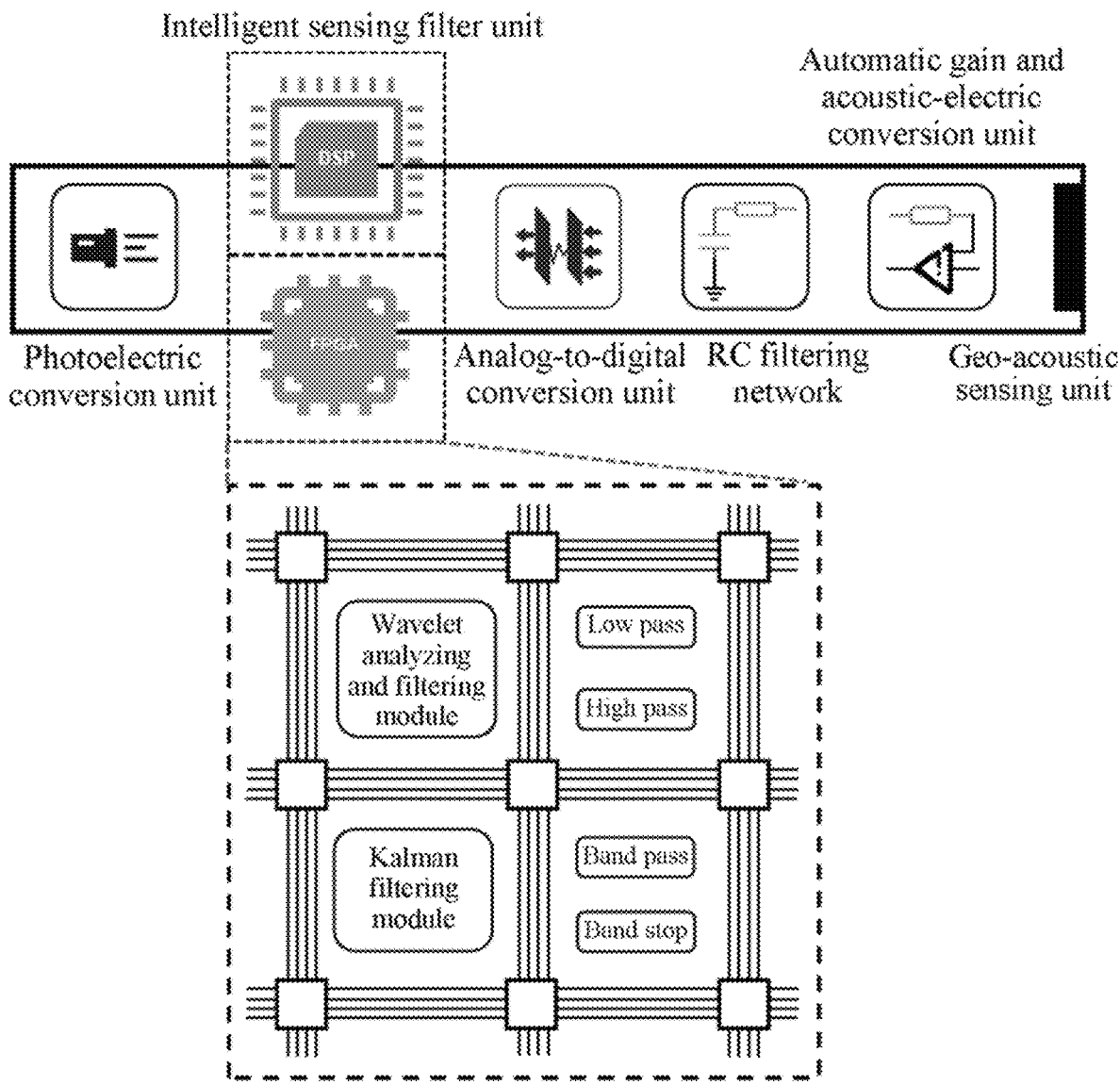
FIG. 2 is a structural schematic view of an intelligent geo-acoustic sensor provided by the present disclosure.

As shown in FIG. 1, the intelligent geo-acoustic sensor provided by the present example includes a geo-acoustic sensing unit, an automatic gain and acoustic-electric conversion unit, an RC filtering network unit, an analog-to-digital conversion unit, an intelligent sensing filter unit, a photoelectric conversion unit and a power supply module which are connected to each other in a communication mode.

The geo-acoustic sensing unit is equipped with high-sensitivity, high-bandwidth and high-specification vibration sensing elements, such as: piezoelectric PZT ceramics to cover and capture geo-acoustic signals at different scales and different frequency bands in rock.

The automatic gain and acoustic-electric conversion unit is equipped with AGC automatic gain control, which is specifically configured for dynamically adjusting the gain according to the intensity of vibration signals and controlling the output signal level. Firstly, the geo-acoustic signal is converted into an analog signal, and then initial adjustment is performed on the analog signal to realize a fast response of a weak signal gain so that a wide gain range is provided for the intelligent sensor.

The RC filtering network unit sets the truncating frequency for acquiring the geo-acoustic signal and completes preliminary filtering by truncating the analog signal in the frequency domain. The analog-to-digital conversion unit is configured for converting the analog signal into a digital signal.

The intelligent sensing filter unit can be equipped with FPGA or DSP according to engineering practice and apparatus production conditions; and can also be configured with modules of low pass, high pass, band pass, band stop, Kalman filtering, wavelet filtering and the like for filtering and denoising. The type and number of specifically configured filtering modules are set according to actual requirements, and are not specifically defined in the present disclosure.

In general, the intelligent sensing filter unit is configured for eliminating the noise of field apparatuses such as fans, drilling rigs and crushers, mingled in the signal, magnetic field interference as well as the temperature drift and zero offset generated inside the geo-acoustic sensing device under certain conditions. In the case that an effective signal and a noise signal are not superimposed in the frequency domain, specific frequency bands of some noise are filtered out directly by using the low-pass, high-pass, band-pass and band-stop filtering modules. In the superimposition of Gaussian white noise caused by the noise signal and pulse interference with the effective signal in the frequency domain, Kalman filtering and wavelet filtering are used to remove peaks and abrupt changes in the acquired signal.

The photoelectric conversion unit is configured for converting the digital signal into an optical signal. The photoelectric conversion unit can resist electromagnetic interference in special environment and long-distance transmission, which realizes high-performance fidelity.

In the present example, the intelligent sensing filter unit can be configured for effectively sensing a useful signal, removing interference noise and ensuring the fidelity effect of the signal. On the other hand, a weak signal can be amplified by using AGC automatic gain control of the automatic gain and acoustic-electric conversion unit, and thus the intelligent geo-acoustic sensor provided by the present disclosure has the effects of high sensitivity, wide sensing frequency and intelligent filtering.

The present example also preferably disposes an outer metal full-shielding frame outside the intelligent geo-acoustic sensor to further block external interference. The power supply module provided in the present example is configured with a high transient absorption or lightning protection device which is controlled to mitigate the influence caused by the interference of an internal transient electric pulse. In other feasible examples, this is not required in the present disclosure.

Example 2

The present example provides a geo-acoustic event location method, including the following steps:

S1: acquiring an observed value of a waveform characterization quantity of a geo-acoustic event.

The waveform characterization quantity selected in the present example includes the arrival time, time domain parameters, spectral information, and waveform shape of a geo-acoustic signal when a wave generated by a geo-acoustic event source $P_{xyz}$ reaches any monitoring point. In other feasible examples, characteristics may be combined as the waveform characterization quantity according to actual requirements, which is not specifically required in the present disclosure.

For example, observed quantities in the present example when the wave generated by the geo-acoustic event source $P_{xyz}$ reaches any monitoring point m include: observed arrival time $t_0^m$, observed time domain parameters $a_0^m$, observed spectral information $f_0^m$, and an observed waveform shape $S_0^m$.

Preferably, the time domain parameters include characteristic parameters of the rise time, duration, amplitude and energy of the waveform, the spectral information is a combination of all frequency information of the waveform after Fourier decomposition, and the waveform shape is a function that defines the shape of a geo-acoustic signal waveform in a time domain. In other feasible examples, the selection of parameters may be adjusted adaptively according to locating precision requirements.

S2: constructing a theoretical propagation difference model and an observed propagation difference model of the waveform characterization quantity between monitoring points. A waveform characterization quantity difference value between two monitoring points is calculated.

Theoretical Propagation Difference Model:

Based on the theoretical geo-acoustic travel time model, geo-acoustic time domain parameter attenuation model, spectral information dissipation model, and waveform shape evolution model, the propagation time when an acoustic wave generated by a geo-acoustic event source $P_{xyz}$ reaches any monitoring point m is $t_{xyz}^m$, the geo-acoustic time domain parameter attenuation quantity is $a_{xyz}^m$, the spectral information dissipation quantity is $f_{xyz}^m$, and the waveform shape evolution quantity is $S_{xyz}^m$. The theoretical values of the above parameters can all be determined using the prior art, e.g. geophysical model inversion.

Then, the theoretical arrival time difference $\Delta t_{xyz}^{nm}$, the time domain parameter attenuation difference $\Delta a_{xyz}^{nm}$, the spectral information dissipation difference $\Delta f_{xyz}^{nm}$ and the waveform shape evolution difference $\Delta s_{xyz}^{nm}$ between two different monitoring points m and n are respectively noted as:

$$\Delta t_{xyz}^{nm} = t_{xyz}^{m} - t_{xyz}^{n}$$

$$\Delta a_{xyz}^{nm} = a_{xyz}^{m} - a_{xyz}^{n}$$

$$\Delta f_{xyz}^{nm} = f_{xyz}^{m} - f_{xyz}^{n}$$

$$\Delta S_{xyz}^{nm} = S_{xyz}^{m} - S_{xyz}^{n}$$

Observed Propagation Difference Model:

Similarly, the observed propagation time difference $\Delta t_0^{nm}$ between two different monitoring points m and n, the observed time domain parameters $\Delta a_0^{nm}$, the observed spectral information $\Delta f_0^{nm}$, and the waveform shape $\Delta S_0^{nm}$ are respectively noted as:

$$\Delta t_0^{nm} = t_0^{m} - t_0^{n}$$

$$\Delta a_0^{nm} = a_0^{m} - a_0^{n}$$

$$\Delta f_0^{nm} = f_0^{m} - f_0^{n}$$

$$\Delta S_0^{nm} = S_0^{m} - S_0^{n}$$

S3: constructing an objective function based on the theoretical propagation difference model and the observed propagation difference model, and obtaining the location of the geo-acoustic event by means of inversion based on the objective function.

The difference values $DT_{xyz}$, $DA_{xyz}$, $DF_{xyz}$ and $DS_{xyz}$ between each observed value and theoretical value are respectively used for describing the degree of deviation between the spatial location of the geo-acoustic events under different theoretical propagation models and the actual spatial location of the geo-acoustic events, and are respectively noted as:

$$DT_{xyz} = \Sigma(\Delta t_{xyz}^{nm} - \Delta t_0^{nm})^2$$

$$DA_{xyz} = \Sigma(\Delta A_{xyz}^{nm} - \Delta A_0^{nm})^2$$

$$DF_{xyz} = \Sigma(\Delta f_{xyz}^{nm} - \Delta f_0^{nm})^2$$

$$DS_{xyz} = \Sigma(\Delta S_{xyz}^{nm} - \Delta S_0^{nm})^2$$

the objective function is constructed as:

$$G(x_p, y_p, z_p, \ldots) = \min \Sigma(DA_{xyz} + DF_{xyz} + DS_{xyz} + DT_{xyz})$$

the above objective function is a non-linear fitting problem, and the position $(x_p, y_p, z_p)$ of the geo-acoustic event source $P_{xyz}$ can be found by solving the above system of equations by the existing computational means.

It should be understood that the objective function provided in the present example is set based on a selected waveform characterization quantity, and in other feasible examples, different combinations of waveform characterization quantities are chosen for use and then the objective function is adaptively modified.

It should be noted that, the present disclosure preferably uses the intelligent geo-acoustic sensor described in Example 1 to acquire data, and uses the geo-acoustic event location method to perform space location inversion.

Example 3

Instability disaster early warning of the rock and soil structure has been a world-wide problem for a long time, and is limited by the one-sided early warning criterion, narrow scale coverage of index information and the like. It is difficult for the existing technical means to adapt to the engineering application scenario of initial fracture and extensional instability in complex multi-field environment.

It can be seen that based on the multi-type fused monitoring device of the high-sensitivity sensing technology, by relying on multi-physical field and multi-scale comprehensive monitoring indexes, seeking suitable and proper entry points for early warning indexes, and constructing an intelligent discrimination system for the geo-acoustic disaster risk are of great engineering value. For this purpose, the present example provides an instability disaster early warning method based on the geo-acoustic event location method, including the following steps:

step 1: forming self-clustering clusters according to the location result of a geo-acoustic event, the self-clustering cluster being obtained by clustering the spatial distribution of the geo-acoustic event.

In general, one self-clustering cluster corresponds to a potential instability disaster, and a high-density region of the self-clustering cluster corresponds to the source of potential instability disasters.

step 2: counting precursor index information of each self-clustering cluster according to a pre-set time window.

In the present example, the precursor indexes include the indexes of the relative energy, moment magnitude, apparent volume, b value of the self-clustering cluster, time series change of the rate of geo-acoustic events, dominant frequency and corner frequency of the geo-acoustic event in the self-clustering cluster; and in other feasible examples, the precursor indexes may be other combinations of the above indexes, and the present disclosure is not specifically limited in this respect.

Specifically, the relative energy $E_r$ is calculated as follows:

$$E_r = \Sigma_1^n dE/n = \Sigma_1^n d[f(t)^2 dt/n$$

the formula, n indicates the number of stations; f(t) is the speed amplitude of ageo-acoustic signal; t is duration of the signal; d is a distance attenuation factor, given by $d = L^{qm}/L^{pm}$, $L^{qm}$ is a theoretical propagation path distance from the center q of the cluster to the monitoring point m, and $L^{qm}$ is a theoretical propagation path distance from the geo-acoustic event q to the monitoring point m.

The moment magnitude $M_w$ characterizes the strength level of a geo-acoustic event.

The apparent volume V characterizes the total volume of rock that is plastically deformed by a geo-acoustic event.

The b value characterizes the relationship of the frequency distribution of the moment magnitude of the geo-acoustic event in the self-clustering cluster over one time window.

The event rate R characterizes the rate of geo-acoustic events generated in the self-clustering cluster over one time window.

The dominant frequency $f_d$ characterizes the dominant frequency of the geo-acoustic event signal in one self-clustering cluster.

The corner frequency $f_c$ value characterizes the corner frequency of the geo-acoustic event signal in one self-clustering cluster.

In order to effectively identify whether a hidden danger exists, the present disclosure determines the precursor factor corresponding to the precursor index according to the following rules.

$P_M$ indicates the sum of the moment magnitudes $M_w$ of all geo-acoustic event signals generated in the self-clustering cluster over one time window, and when the sum of the moment magnitudes increases compared with that over a previous time window, a precursor factor $P_M$ corresponding to the moment magnitude $M_w$ is noted as 1.

$P_E$ indicates the sum of the relative energy $E_r$ of all geo-acoustic event signals generated in the self-clustering cluster over one time window, and when the sum of the relative energy increases compared with that over a previous time window, a precursor factor $P_E$ corresponding to the relative energy $E_r$ is noted as 1.

$P_A$ indicates the sum of the apparent volume V of all geo-acoustic event signals generated in the self-clustering cluster over one time window, and when the sum of the apparent volume increases compared with that over a previous time window, a precursor factor $P_A$ corresponding to the apparent volume V is noted as 1.

$P_b$ indicates a decrease in the b value over one time window compared with the b value over a previous time window, and is noted as 1.

$P_R$ indicates the change in the event rate R over one time window compared with that over a previous time window, and is noted as 1.

$P_{f_d}$ indicates a frequency band formed by counting the dominant frequency $f_d$ of all geo-acoustic event signals generated in the self-clustering cluster over one time window, and is noted as 1 when there is a change in the number of dominant frequency bands compared with dominant frequency bands over a previous time window.

$P_{f_c}$ indicates the frequency band formed by counting the corner frequencies $f_c$ of all the geo-acoustic event signals generated in the self-clustering cluster in a time window, and is noted as 1 when there is a change in the number of corner frequency bands compared to corner frequency bands over a previous time window.

Further, the above-mentioned indexes are divided into three main categories in the present example, as follows:

the relative energy, moment magnitude, apparent volume and b value of the self-clustering cluster are categorized into the first main category, the time series change of the rate of geo-acoustic events is categorized into the second main category, the dominant frequency and corner frequency are categorized into the third main category, and the corresponding precursor factors thereof are expressed as $P_1$, $P_2$ and $P_3$, they are:

$$P_1 = P_M + P_E + P_b + P_A$$

$$P_2 = P_R$$

$$P_3 = P_{f_d} + P_{f_c}$$

step 3: performing instability disaster early warning analysis based on precursor factors of precursor indexes of each self-clustering cluster. The greater the sum of the precursor factors of all the precursor indexes of the self-clustering cluster is, the greater the risk is.

It should be understood that the greater the sum of $P_1+P_2+P_3$ is, the higher the risk is; and the less the sum is, the higher the safety is. Thus, the present disclosure sets rule indexes for actual operation based on experience research, as follows:

if $P_1+P_2+P_3=3$, a red level, indicating that operation in the area is prohibited;
if $P_1+P_2+P_3=2$, a yellow level, indicating that the hidden danger of a potential source of danger requires to be removed;
if $P_1+P_2+P_3=1$, a blue level, indicating that operation can be carried out under real-time monitoring; and
if $P_1+P_2+P_3=0$, a green level, indicating safe operation.

The needs of the present disclosure can also be met without classification in other feasible examples, and the present disclosure is not specifically limited in this respect.

In other feasible examples, the precursor index also includes an S value, and the S value characterizes the sum of the frequency, average energy level, and maximum energy level composition of a geo-acoustic event in a self-clustering cluster over one time window. $P_S$ indicates that the S value over one time window increases compared with the S value over the previous single time window, and is noted as 1. In the present example, it is preferable that $P_S$ indicates that the S value over a single time window in the time series shows a continuous increasing trend and the value is at a high level, and noted as 1.

In other feasible examples, the relative energy, moment magnitude and apparent volume are categorized into the first main-category precursor factor $P_1$ (seismic source parameter), the b value, the S value and the rate of geo-acoustic events is the second main-category precursor factor $P_2$ (time series), the dominant frequency and the corner frequency are the third main-category precursor factor $P_3$ (spectral characteristics), and they have a Boolean operation relationship. Then, in step 3, instability disaster early warning analysis is performed based on the precursor factor formed by the precursor indexes of each self-clustering cluster according to the Boolean operation relationship.

The time window is set based on the experience or need, for example, when historical training sample data is available, the time window with the best early warning efficiency is taken, and the precursor factors are counted based on this. When no historical training sample data is available, the default time window length is set to 1 month, and the interval time counted in a mobile mode is 7 days, with no specific limitations in other feasible examples.

It should be noted that, preferably, in the present example, the early warning method described in Example 3 is used to guide operations based on the location of the sound source determined in Example 2. As shown in FIG. 1, Examples 1-3 of the present disclosure constitute a monitoring system for geo-acoustic events, integrating geo-acoustic signal acquisition, geo-acoustic event location and geo-acoustic event instability disaster early warning. The monitoring system includes a geo-acoustic signal sensing module, a geo-acoustic event location module and a geo-acoustic event instability disaster early warning module connected in a communication mode, and the geo-acoustic signal sensing module is configured for sensing geo-acoustic signals and acquiring relevant data for locating subsequent geo-acoustic events. The geo-acoustic event location module is configured for locating the geo-acoustic event, and reference may be made to the description of Example 2 described above for the specific implementation process. The geo-acoustic event instability disaster early warning module is configured for performing instability disaster early warning analysis, and reference may be made to the description of Example 3 described above for the specific implementation process.

It should be understood that the division of the above-mentioned functional modules or units is merely division of logical function, and other division modes may exist during actual implementation. For example, a plurality of units or components may be combined or integrated into another system, or some characteristics may be ignored or not performed. At the same time, the above integrated unit can be implemented in the form of hardware, e.g. when the geo-acoustic signal sensing module is implemented in the form of hardware, it corresponds to the intelligent geo-acoustic sensor described in Example 1 of the present disclosure. The above integrated unit can also be implemented in the form of a software function unit.

In some feasible modes, the present disclosure further provides a readable storage medium storing a computer program, the computer program being called by a processor to execute:
S1: acquiring an observed value of a waveform characterization quantity of a geo-acoustic event;
S2: constructing a theoretical propagation difference model and an observed propagation difference model of the waveform characterization quantity between monitoring points; and
S3: constructing an objective function based on the theoretical propagation difference model and the observed propagation difference model, and obtaining the location of the geo-acoustic event by means of inversion based on the objective function;
or to execute:
step 1: forming self-clustering clusters according to the location result of a geo-acoustic event, the self-clustering cluster being obtained by clustering the spatial distribution of the geo-acoustic event;
step 2: counting precursor index information of each self-clustering cluster according to a pre-set time window; and
step 3: performing instability disaster early warning analysis based on precursor factors of precursor indexes of each self-clustering cluster. The greater the sum of the precursor factors of all the precursor indexes of the self-clustering cluster is, the greater the risk is.

Reference may be made to the description of the method for the specific implementation process of each step, which will not be repeated here in the present disclosure.

In some feasible modes, the present disclosure further provides a system, including a processor and a memory, the memory storing a computer program, the processor calling the computer program to execute:
S1: acquiring an observed value of a waveform characterization quantity of a geo-acoustic event;
S2: constructing a theoretical propagation difference model and an observed propagation difference model of the waveform characterization quantity between monitoring points; and
S3: constructing an objective function based on the theoretical propagation difference model and the observed propagation difference model, and obtaining the location of the geo-acoustic event by means of inversion based on the objective function;
or to execute:
step 1: forming self-clustering clusters according to the location result of a geo-acoustic event, the self-clustering cluster being obtained by clustering the spatial distribution of the geo-acoustic event;
step 2: counting precursor index information of each self-clustering cluster according to a pre-set time window; and
step 3: performing instability disaster early warning analysis based on precursor factors of precursor indexes of each self-clustering cluster. The greater the sum of the precursor factors of all the precursor indexes of the self-clustering cluster is, the greater the risk is.

For specific implementation processes of each step, reference may be made to the description of the foregoing method, which will not be repeated in the present disclosure.

It should be understood that, in this embodiment of the present disclosure, the mentioned processor may be a central processing unit (Central Processing Unit, CPU), or the processor may be another general purpose processor, a digital signal processor (Digital Signal Processor, DSP), an application-specific integrated circuit (Application-Specific Integrated Circuit, ASIC), a field-programmable gate array (Field-Programmable Gate Array, FPGA) or another programmable logic device, a discrete gate or a transistor logic device, a discrete hardware component, or the like. The general-purpose processor may be a microprocessor, or the processor may be any conventional processor and the like. The memory may include a read-only memory (ROM) and a random access memory (RAM), and provide instructions and data to the processor. A part of the memory may further include a non-volatile random access memory. For example, the memory may further store information of a device type.

The readable storage medium is a computer-readable storage medium, which may be an internal storage unit of the controller described in any of the foregoing embodiments, such as a hard disk or a memory of the controller. The readable storage medium may also be an external storage device of the controller, such as a plug-in hard disk, a smart media card (SMC), a secure digital (SD) card, or a flash card that is equipped on the controller. Further, the readable storage medium may further include an internal storage unit of the controller and an external storage device, the readable storage medium is configured to store the computer program and another program and data that are required by the controller. The readable storage medium may be further configured to temporarily store data that has been outputted or data to be outputted.

It should be emphasized that, examples described in the present disclosure are illustrative rather than restrictive, and therefore the present disclosure is not limited to the examples described in the specific implementations. All other implementations obtained by a person skilled in the art according to the technical solutions of the present disclosure do not depart from the spirit and scope of the present disclosure, and whether modified or replaced, also belong to the protection scope of the present disclosure.

What is claimed is:

1. An intelligent geo-acoustic sensor, comprising a geo-acoustic sensing unit, an automatic gain and acoustic-electric conversion unit, an RC filtering network unit, an analog-to-digital conversion unit, an intelligent sensing filter unit and a photoelectric conversion unit, wherein the geo-acoustic sensing unit, the automatic gain and acoustic-electric conversion unit, the RC filtering network unit, the analog-to-digital conversion unit, the intelligent sensing filter unit and the photoelectric conversion unit are connected to each other in a communication mode;
wherein the geo-acoustic sensing unit acquires multi-band geo-acoustic signals;
the automatic gain and acoustic-electric conversion unit is configured for converting a geo-acoustic signal into an analog signal, and performing initial adjustment on the analog signal to realize a fast response of a weak signal gain;
the RC filtering network unit is configured for truncating the analog signal in a frequency domain to complete preliminary filtering;
the analog-to-digital conversion unit is configured for converting the analog signal into a digital signal;
the intelligent sensing filter unit is configured for performing denoising and filtering processing on the digital signal; and
the photoelectric conversion unit is configured for converting the digital signal into an optical signal, wherein a signal acquired by the intelligent geo-acoustic sensor is used for locating a geo-acoustic event according to steps of a geo-acoustic event location method comprising the following steps:

S1: acquiring an observed value of a waveform characterization quantity of the geo-acoustic event, the waveform characterization quantity comprising: any combination of an arrival time time domain parameters, spectral information, and waveform shape of a geo-acoustic signal when a wave generated by a geo-acoustic event source reaches any monitoring point;

S2: constructing a theoretical propagation difference model and an observed propagation difference model of the waveform characterization quantity between monitoring points, wherein a waveform characterization quantity difference value between two monitoring points is calculated; and S3: constructing an objective function based on the theoretical propagation difference model and the observed propagation difference model and obtaining a location of the geo-acoustic event by inversion based on the objective function.

2. The intelligent geo-acoustic sensor according to claim 1, wherein a metal full-shielding frame is disposed outside the intelligent geo-acoustic sensor.

3. The intelligent geo-acoustic sensor according to claim 1, wherein in the geo-acoustic event location method, the objective function is as follows:

$$G(x_p, y_p, z_p, \ldots) = \min \Sigma(DA_{xyz} + DF_{xyz} + DS_{xyz} + DT_{xyz})$$

wherein $G(x_p, y_p, z_p, \ldots)$ indicates the objective function of the geo-acoustic event $(x_p, y_p, z_p)$, $x_p, y_p, z_p$ is a position coordinate of the geo-acoustic event, and $DF_{xyz}$, $DA_{xyz}$, $DS_{xyz}$ and $DT_{xyz}$ indicate a degree of deviation of an observed quantity and a theoretical value of a propagation difference of the waveform characterization quantity, respectively.

4. The intelligent geo-acoustic sensor according to claim 3, wherein in the geo-acoustic event location method, formulas for calculating $DF_{xyz}$, $DA_{xyz}$, $DS_{xyz}$ and $DT_{xyz}$ are respectively as follows:

$$DT_{xyz} = \Sigma(\Delta t_{xyz}^{nm} - \Delta t_0^{nm})^2$$

$$DA_{xyz} = \Sigma(\Delta A_{xyz}^{nm} - \Delta A_0^{nm})^2$$

$$DF_{xyz} = \Sigma(\Delta f_{xyz}^{nm} - \Delta f_0^{nm})^2$$

$$DS_{xyz} = \Sigma(\Delta S_{xyz}^{nm} - \Delta S_0^{nm})^2$$

wherein $\Delta t_{xyz}^{nm}$ and $\Delta t_0^{nm}$ respectively indicate a theoretical arrival time difference and an observed quantity of the arrival time difference between two different monitoring points m and n; $\Delta A_{xyz}^{nm}$ and $\Delta A_0^{nm}$ respectively indicate a theoretical attenuation difference and an observed value of an attenuation difference of the time domain parameters $a_0$ between two different monitoring points m and n; $\Delta f_{xyz}^{nm}$ and $\Delta f_0^{nm}$ respectively indicate a theoretical difference value and an observed difference value of the spectral information f between two different monitoring points m and n; and $\Delta S_{xyz}^{nm}$ and $\Delta S_0^{nm}$ respectively indicate a theoretical value of a waveform shape evolution difference and an observed value of the waveform shape evolution difference between two different monitoring points m and n.

5. The intelligent geo-acoustic sensor according to claim 1, wherein in the geo-acoustic event location method, the time domain parameters comprise any one or any combination of a rise time, a duration, an amplitude and energy time domain parameters of a waveform, and the spectral information is any combination of all frequency information of the waveform after Fourier decomposition; and the waveform shape is a function, wherein the function defines a shape of a geo-acoustic signal waveform in a time domain.

6. A geo-acoustic event monitoring system, comprising a geo-acoustic signal sensing module, a geo-acoustic event location module and a geo-acoustic event instability disaster early warning module, wherein the geo-acoustic signal sensing module, the geo-acoustic event location module and the geo-acoustic event instability disaster early warning module are connected in a communication mode, wherein the geo-acoustic signal sensing module is configured for sensing geo-acoustic signals;

the geo-acoustic event location module is configured for locating geo-acoustic events by using a geo-acoustic event location method; and the geo-acoustic event instability disaster early warning module is configured for performing instability disaster early warning analysis by using an instability disaster early warning method based on the geo-acoustic event location method, wherein the instability disaster early warning method comprises the following steps:

step 1: forming self-clustering clusters according to a location result of the geo-acoustic event, the self-clustering clusters being obtained by clustering a spatial distribution of the geo-acoustic event;

step 2: counting precursor index information of each of the self-clustering clusters according to a pre-set time window, wherein the precursor index information is any combination of indexes of a relative energy, a moment magnitude, an apparent volume, b value of each of the self-clustering clusters, a time series change of a rate of geo-acoustic events, a dominant frequency and a corner frequency of the geo-acoustic event in each of the self-clustering clusters; and if a sum of a category of precursor indexes of all the geo-acoustic events in each of the self-clustering clusters under one time window becomes larger compared with a sum of a same category of precursor indexes under a previous time window, a precursor factor of the corresponding precursor index is 1; and step 3: performing instability disaster early warning analysis based on precursor factors of precursor indexes of each of the self-clustering clusters, wherein a risk increases as a sum of the precursor factors of all the precursor indexes of each of the self-clustering clusters increases, wherein the geo-acoustic event location method comprising the following steps:

S1: acquiring an observed value of a waveform characterization quantity of the geo-acoustic event, the waveform characterization quantity comprising: any combination of an arrival time time domain parameters, spectral information, and waveform shape of a geo-acoustic signal when a wave generated by a geo-acoustic event source reaches any monitoring point;

S2: constructing a theoretical propagation difference model and an observed propagation difference model of the waveform characterization quantity between monitoring points, wherein a waveform characterization quantity difference value between two monitoring points is calculated; and S3: constructing an objective function based on the theoretical propagation difference model and the observed propagation difference model and obtaining a location of the geo-acoustic event by inversion based on the objective function.

7. The geo-acoustic event monitoring system according to claim 6, wherein the objective function is as follows:

$$G(x_p, y_p, z_p, \ldots) = \min \Sigma(DA_{xyz} + DF_{xyz} + DS_{xyz} + DT_{xyz})$$

wherein $G(x_p, y_p, z_p, \ldots)$ indicates the objective function of the geo-acoustic event $(x_p, y_p, z_p)$, $x_p, y_p, z_p$ is a position coordinate of the geo-acoustic event, and $DF_{xyz}$, $DA_{xyz}$, $DS_{xyz}$ and $DT_{xyz}$ indicate a degree of deviation of an observed quantity and a theoretical value of a propagation difference of the waveform characterization quantity, respectively.

8. The geo-acoustic event monitoring system according to claim 7, wherein formulas for calculating $DF_{xyz}$, $DA_{xyz}$, $DS_{xyz}$ and $DT_{xyz}$ are respectively as follows:

$$DT_{xyz} = \Sigma(\Delta t_{xyz}^{nm} - \Delta t_0^{nm})^2$$

$$DA_{xyz} = \Sigma(\Delta A_{xyz}^{nm} - \Delta A_0^{nm})^2$$

$$DF_{xyz} = \Sigma(\Delta f_{xyz}^{nm} - \Delta f_0^{nm})^2$$

$$DS_{xyz} = \Sigma(\Delta S_{xyz}^{nm} - \Delta S_0^{nm})^2$$

wherein $\Delta t_{xyz}^{nm}$ and $\Delta t_0^{nm}$ respectively indicate a theoretical arrival time difference and an observed quantity of the arrival time difference between two different monitoring points m and n; $\Delta A_{xyz}^{nm}$ and $\Delta A_0^{nm}$ respectively indicate a theoretical attenuation difference and an observed value of an attenuation difference of the time domain parameters $a_0$ between two different monitoring points m and n; $\Delta f_{xyz}^{nm}$ and $\Delta f_0^{nm}$ respectively indicate a theoretical difference value and an observed difference value of the spectral information f between two different monitoring points m and n; $\Delta S_{xyz}^{nm}$ and $\Delta S_0^{nm}$ respectively indicate a theoretical value of a waveform shape evolution difference and an observed value of the waveform shape evolution difference between two different monitoring points m and n.

9. The geo-acoustic event monitoring system according to claim 6, wherein the time domain parameters comprise any one or any combination of a rise time, a duration, an amplitude and energy time domain parameters of a waveform, and the spectral information is any combination of all frequency information of the waveform after Fourier decomposition; and the waveform shape is a function, wherein the function defines a shape of a geo-acoustic signal waveform in a time domain.

* * * * *